United States Patent [19]

Piampiano

[11] 4,219,579
[45] Aug. 26, 1980

[54] MEANS AND METHOD IMPROVING TASTE OF SACCHARINE SWEETENED FOOD PRODUCTS

[76] Inventor: Carl Piampiano, 2601 Wadsworth Rd., Zion, Ill. 60099

[21] Appl. No.: 6,444

[22] Filed: Jan. 25, 1979

[51] Int. Cl.² ............................................. A23L 1/236
[52] U.S. Cl. .................................. 426/548; 426/590; 426/655; 426/658; 426/431
[58] Field of Search ............... 426/548, 658, 590, 599, 426/431, 655, 650

[56] References Cited

U.S. PATENT DOCUMENTS

| 82,909 | 10/1868 | Wesselhoeft | 426/655 |
|---|---|---|---|
| 2,539,160 | 1/1951 | Phillips | 426/651 |
| 2,790,719 | 4/1957 | Glickman | 426/650 |

FOREIGN PATENT DOCUMENTS

| 11522 | 5/1892 | United Kingdom | 426/590 |

OTHER PUBLICATIONS

Lust, *The Herb Book*, Benedict Lust Publications, 1974, pp. 412, 413.

*Primary Examiner*—Esther M. Kepplinger

[57] ABSTRACT

An aqueous extract of *Gentiana lutea*, when added to saccharine, substantially eliminates the bitter aftertaste associated with saccharine.

9 Claims, No Drawings

MEANS AND METHOD IMPROVING TASTE OF SACCHARINE SWEETENED FOOD PRODUCTS

FIELD OF THE INVENTION

The subject invention relates to a new food sweetner containing saccharine and an aqueous extract of Gentiana Lutea and a method for producing the same.

BACKGROUND OF THE INVENTION

Artificial sweetners have been employed to replace the socalled natural sweetners in foods for a substantial period of time. Originally these artificial sweetners were used primarily for food products made specially for people suffering from diabetes. However, a trend has been developing over the past twenty or thirty years in which a substantially higher volume of artificially sweetened food has been consumed by diet conscious Americans as part of an attempt to control or reduce their weight.

In addition, the past fifteen years has seen the inauguration and growth of sales of artificially sweetened canned soft drinks, both carbonated and noncarbonated, to a point where these beverages have a substantial market, in many cases, rivaling their naturally sweetened counterparts.

At the present time, by far the most common artificial sweetner is saccharine. While saccharine is a compound which produces the sweetening taste sensation at a level many times greater than an equivalent amount of sugar, there is a limiting factor to its use and that is the bitter aftertaste associated with its consumption. This is true even when saccharine is used at the extremely low levels needed to produce equivalent sweetness to comparably high levels of sugar and is particularly apparent in products having a high sweetness level such as certain canned fruits and, particularly artificially sweetened soft drinks because, in the latter case, the sweetness flavor sensation contributes substantially to the overall flavor of the beverage itself.

Also, and perhaps more importantly, levels of saccharine have been utilized which produce a sweetness level less than their naturally sweetened counterpart beverages because the amount of saccharine which would produce the desired level of sweetness, theoretically, produces such a pronounced aftertaste as to be substantially unpalatable. Also, and perhaps because of this factor, when saccharine is employed at levels which would produce an equivalent sweetness to that traditionally associated with naturally sweetened beverages, there is very little noticeable increase in sweetness resulting from the addition of the last incremental amounts.

THE INVENTION

It has now been found that when the aqueous extract of Gentiana lutea is added at low levels to saccharine, that when the saccharine containing the extract is utilized as an artifical sweetner in a food or beverage product, the bitter aftertaste conventionally associated with saccharine is substantially reduced or eliminated and, further, that higher levels of saccharine can be employed to produce a stronger sweetness sensation then have been previously conventionally employed. With regard to the latter phenomenon, it is not clear whether the ability to utilize increased levels of saccharine is derived from merely the elimination of the aftertaste or, in part, through some synergistic effect of the extract on possibly increasing the sweetness imparted by the saccharine itself.

Gentiana lutea has been utilized in extract form as a tonic and is generally regarded as a member of a class of plants referred to in pharmaceutical literature as stomachics. Stomachics are bitter tonics which increase pancreatic secretion by stimulating the gastric mucous membrane. It has been noted that the improved digestive and metabolic functions resulting from the utilization of stomachics usually produce better appetites. The G. lutea root is utilized to provide the basis for "bitters" both used as a tonic as described above and also for use in conjunction with the flavoring of alcoholic beverages.

The aqueous extract of the G. lutea root which forms the product of this invention, contains a variety of chemical compositions and it is not known, for certain, which compound or compounds interact with saccharine in the manner described. Therefore, throughout the specification and claims, the utilization of "extract" or "aqueous extract" is meant to cover utilization of each of the specific compounds known to be present in the aqueous root extract.

Compounds which have been found in the aqueous extract of the root of G. lutea are gentiopicrin, gentianine yellow pigments such as gentisin, isogentisin and gentioside. Also present are tannins, sucrose, gentiobiose and a trisaccharide formed of glucose, fructose and gentianose.

Since the gentiopicrin is the active component responsible for the bitter taste of gentian, and is also, in all probability, the active ingredient in the extract when used as a stomachic, it is suspected that the active component reacting on the taste sensors along with saccharine is gentiopicrin. Gentiopicrin is a glycoside composed of glucose and mesogentiogenin. This particular compound is fonnd in the plant in a substantially pure state.

Another compound which may work directly in combination with the saccharine or, as an additive with the gentiopicrin to produce the desired debittering effect is gentianine which is an alkaloid. Regardless of the particular compound or compounds which actively produce the taste phenomenon previously described, there is no doubt that the extract does act to prevent the bitter aftertaste conventionally associated with saccharine itself.

As will be seen from the subsequent examples, the aqueous extract interacts at extremely low levels which is important due to the characteristic taste associated with the bitter components of the extract.

In the examples below, unless otherwise indicated, the gentian infusion was prepared by cutting ten grams of gentian root shavings into $\frac{1}{8}$ by $\frac{1}{8}$ inch pieces and soaking them in one liter of water which is brought to a boil in a covered container and, is immediately set aside to allow the infusion process to be completed. The infusion is then drained and strained through a fine tea strainer with all of the resultant liquid being saved.

Except where otherwise indicated, 1/100 of a milliliter of infusion is added to 12 milligrams of saccharine and, based upon the particular extraction set forth above, this is the preferred ratio of the infusion to saccharine. This ratio may be varied for best results with certain types of products. For the purpose of counteracting the undesirable taste of saccharine in coffee, for example, a much higher ratio may be used. In carbonated soft drinks, and especially those which contain caffeine, such as diet cola drinks, a lower ratio may be used for best results. It is believed that a difference in the amount of the infusion necessary for different products is due to the fact that the infusion has a unique reaction on certain products such as coffee and caffeine, this reaction resulting in a mellowing and intensifying of the taste of these products. The amount of saccharine utilized is based upon the amount of saccharine which would theoretically provide a sweetness level equivalent to that present in at least some of the sugar-sweetened soft drink beverages if such high levels of saccharine addition were possible.

It is apparent, of course, that both the amount of saccharine conventionally used and that which is desirable varies with the particular type and flavor of soft drink chosen.

It is further apparent that the amount of aqueous extract will vary depending upon the particular conditions associated with the extraction relative in particular to the traditional extraction variance of type of solvent, time and temperature of the extraction process and differences associated with different samples of the *G. lutea* root.

EXAMPLE I

This sample provides a comparison between five commercially produced soft drinks which contain saccharine in varying amounts as an artificial sweetner. Both 16 ounce and quart bottles of the conventionally produced soft drinks were opened and sufficient saccharine was added so that there were twelve milligrams per fluid ounce of saccharine present in each of the bottles. An extract of the subject invention was added in amounts set forth in the table below. The extract was prepared as set forth above except that ten gallons of water were utilized with one gram of gentian root. When the original beverage as commercially prepared was compared with the beverage containing the infusion of the subject invention and the added saccharine it was noted that the infusion-containing beverage produced a product with substantially higher sweetness and no bitter aftertaste even with the presence of, in some instances, almost double the amount of saccharine originally utilized in the commercial manufacture. The results of these tests are as indicated below:

Table I

| Beverage | ml of infusion per 16 oz. bottle | ml of infusion per quart | mg of saccharine per fluid oz. in commercial formula |
|---|---|---|---|
| Tab | 0.05 | 0.1 | 9.2 |
| Diet Pepsi | 0.025 | 0.05 | 10.46 |
| Diet 7-Up | 0.5–1.0 | 1.0–2.0 | 7.3 |
| Fresca | 0.5–1.0 | 1.0–2.0 | 10 |
| RC-Lemon Lime | 0.5–1.0 | 1.0–2.0 | 7 |

(Tab and Fresca are registered trademarks of the Coca Cola Company, Atlanta, Georgia. Diet Pepsi is a trademark of Pepsi Co., Dallas, Texas. RC Lemon-Lime is a trademark of RC Cola Beverage Company of Columbus, Georgia, and Diet 7-Up is a trademark of 7-Up Company of America of St. Louis, Missouri.)

The amount of infusion in all instances set forth in the attached table is the maximum amount preferred for each of the particular beverages. This is due to the very bitter nature of some of the compounds present in the infusion and, with this particular sample it was felt that the compounds such as gentiopicrin producing the bitter flavor were present in stronger quantities than normal. In any event, once certain threshold levels of the bitters are exceeded the bitter taste commonly associated with them becomes apparent in the beverage itself. As can be seen this varies in amount based upon components of the soft drink independent of the saccharine i.e. the level added to each of the containers was based not upon saccharine addition but strictly upon the interfering and undesirable bitter taste. It is not certain which components of the beverages tested effect the threshold level for the bitter taste of the infusion although, as noted, there is a substantial variance in threshold level even within the particular family of products such as diet colas.

EXAMPLE II

An infusion was prepared as before (not as in EXAMPLE I) and this was added to 600 milligrams of saccharine in a lemonade beverage prepared from unsweetened Wylers lemonade mix. Wylers is a trademark of Wylers Borden Co., of Northbrook, Illinois. The level of saccharine chosen was to replace the one cup of sugar called for in the recipe.

Table II

| # ml. of infusion per liter | Mg. of saccharine per fl. oz. | Findings of neutralizing of saccharin after-taste |
|---|---|---|
| ¼ ml | 12 | Not noticeable |
| ½ ml | 12 | Takes effect but not enough |
| ¾ ml | 12 | Effective |
| 1 ml | 12 | Most effective but looses sweetness very slightly and saccharine can be increased pleasantly above the 12 mg. |
| 1¼ ml | 12 | Slight change in sweet but here again saccharine can be raised to 20 mg. per fluid oz. and have a more sweetening effect. |
| 1½ ml | 12 | Stops loosing sweetness - no change |
| 2 ml | 12 | Same sweetness - starts loosing tartness. |
| 5 ml | 12 | Same sweetness - stops loosing tartness. |
| 10 ml | 12 | Same sweetness - taste of Gentian recognizable. |
| 20 ml | 12 | Same sweetness - taste of Gentian identifiable. |
| 50 ml | 12 | Same sweetness - taste of Gentian dominant. |

As can be seen from the table set out above from the time the infusion is effective i.e. about 1 milliliter per liter there is a slight change in sweetness which occurs between one milliliter and 1.5 milliliters per liter but additional amounts of gentian do not bring about an increase in sweetness and, eventually, at comparatively high levels of infusion addition, the bitter flavor note associated with the gentian extract becomes a factor in the overall taste sensation.

EXAMPLE III

To more directly compare the "enhanced sweetening effect" samples of lemonade were prepared as in example II along with the infusion utilized in Example II and it was found that at the level of one milliliter of infusion it was possible to raise the addition of saccharine above the twelve milligram per fluid ounce base level while without the use of infusion the additional saccharine had no effect on the sweetness sensation. It was also found that, in fact, the sweetening effect of the saccharine stopped at a level of nine milligrams per fluid ounce without the presence of the infusion.

As can be seen from the above experiments, high acid foods such as lemonade and the acid carbonated soft drinks such as Fresca do not inhibit the effect of the removal of the aftertaste from saccharine. In fact, the removal of the aftertaste occurs in any environment where there is ample amounts of infusion in conjunction with the saccharine. Example IV was performed to illustrate that, at least at levels commonly used, there is no interference with the other basic food taste i.e. salt.

EXAMPLE IV

A salt solution was prepared at 50% saturation i.e. to a ten percent salt concentration. To this solution was added a varying percentage of an infusion prepared as in examples II and III. The results are summarized in the Table below:

| # ml added | % of additive | results |
|---|---|---|
| 1-25 | 2½ | Attacks salt but hardly noticeable. |
| 30 | 3 | Attack on salt is noticeable. |
| 37½ | 3¾ | Taste of gentian starts but ingredient not recognizable. |
| 40 | 4 | Taste of gentian more noticeable but not recognizable. |
| 50 | 5 | Taste of salt solution changed but gentian not recognizable. |
| 52½ | 5¼ | Gentian slightly recognizable. |
| 57½ | 5¾ | Gentian recognizable. |
| 62½ | 6¼ | Gentian identifiable. |
| 65 | 6½ | Taste of gentian dominates over salt after it is swallowed. |
| 67½ | 6¾ | Taste of gentian stronger; salt aftertaste gone in one minute. |
| 70 | 7 | Progressively same; salt aftertaste disappears more rapidly. |
| 75 | 7½ | Taste is like gentian tea with salt, but salt aftertaste disappears progressively more rapidly. |
| 80, 95 | | Taste is like gentian tea with salt, but salt aftertaste disappears progressively more rapidly and then completely. |
| 100 | 10% | Taste is like gentian tea, salt aftertaste disappears instantly. |
| 650 | 65% | Taste of gentian with salt identifiable. |
| 800 | 80% | Taste of gentian with trace of salt. |
| 900 | 90% | Taste of gentian with no salt detectable. |

As can be seen from the above, there is some interaction between salt and the infusion of the subject invention but the salt taste is minimized at levels generally higher than would be used conventionally.

As can be seen from the preceding examples, basically any food system which requires sweetening can be artifically sweetened with the product of the subject invention. Salt containing foodstuffs do not lose the salty taste sensation at nominal levels of addition used to coact with saccharine, high acidity does not interfere with the action of the product of this invention nor does carbonation.

It is apparent that manipulation of extraction conditions will substantially alter the values associated with the percentage of infusion preferred and variations in dilution and/or strength resulting from these deferring operating conditions would be apparent to those skilled in the art.

I hereby claim:

1. An artificial sweetner comprising saccharine and at least an amount of an aqueous extract of *Gentiana lutea* sufficient to reduce the bitter aftertaste of saccharine.

2. An artificially sweetened soft drink containing saccharine and an aqueous extract of *Gentiana lutea* in an amount sufficient to reduce the bitter aftertaste of said saccharine.

3. The product of claims 1 or 2 in which one milliliter of extract is combined with about six hundred milligrams of saccharine.

4. The product of claim 2 in which the soft drink is a cola and the extract does not exceed about 0.05 milliliters per 16 ounces of beverage.

5. The product of claim 2 in which the soft drink is a carbonated lemon-lime formulation and the extract does not exceed about 1.0 ml per 16 ounces of beverage.

6. The product of claim 2 in which the soft drink is a high acid non-carbonated beverage and saccharine is added at a level of from 9 to 12 milligrams per fluid ounce and the aqueous infusion is present at between about 0.5 to 2 ml per liter of beverage.

7. The product of claims 2 or 6 in which the beverage is lemonade.

8. A method for producing an artificial sweetner containing saccharine comprising:
   (a) cutting the root of *Gentiana lutea* into pieces;
   (b) subjecting said pieces to an aqueous extraction under conditions sufficient to extract components which remove the bitter aftertaste from saccharine, from said pieces;
   (c) separating the pieces from said extract; and
   (d) combining the extract with saccharine.

9. The method of claim 8 in which the pieces are placed in water which is then brought to a boil and allowed to cool prior to the separation step.

* * * * *